(12) United States Patent
Fanous et al.

(10) Patent No.: US 10,164,297 B2
(45) Date of Patent: Dec. 25, 2018

(54) PROTECTIVE LAYER SYSTEM FOR A METALLIC LITHIUM ANODE

(71) Applicant: Robert Bosch GmbH, Stuttgart (DE)

(72) Inventors: Jean Fanous, Pfullingen (DE); Martin Tenzer, Nuertingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 68 days.

(21) Appl. No.: 15/305,805

(22) PCT Filed: Apr. 8, 2015

(86) PCT No.: PCT/EP2015/057627
§ 371 (c)(1),
(2) Date: Dec. 30, 2016

(87) PCT Pub. No.: WO2015/165702
PCT Pub. Date: Nov. 5, 2015

(65) Prior Publication Data
US 2017/0187075 A1 Jun. 29, 2017

(30) Foreign Application Priority Data
Apr. 30, 2014 (DE) .................. 10 2014 208 174

(51) Int. Cl.
*H01M 2/16* (2006.01)
*H01M 4/134* (2010.01)
(Continued)

(52) U.S. Cl.
CPC ..... *H01M 10/4235* (2013.01); *H01M 2/1673* (2013.01); *H01M 4/134* (2013.01);
(Continued)

(58) Field of Classification Search
CPC .......... H01M 10/4235; H01M 10/052; H01M 4/134; H01M 2/1673; H01M 4/382; H01M 2004/027; H01M 2220/30; H01M 2220/20
See application file for complete search history.

(56) References Cited

U.S. PATENT DOCUMENTS

| | | | |
|---|---|---|---|
| 5,387,482 A | 2/1995 | Anani | |
| 2013/0017441 A1* | 1/2013 | Affinito | H01M 2/1673 429/211 |
| 2013/0273422 A1* | 10/2013 | Wegner | H01M 4/04 429/212 |

FOREIGN PATENT DOCUMENTS

DE 102010043111 A1 5/2012

* cited by examiner

*Primary Examiner* — Stewart A Fraser
(74) *Attorney, Agent, or Firm* — Norton Rose Fulbright US LLP; Gerard Messina (57) ABSTRACT

A protective layer system for a metallic lithium-containing anode of a lithium cell, for example a lithium-sulfur cell and/or lithium-oxygen cell. To increase the service life and reliability of the cell, the protective layer system includes a lithium ion-conducting layer, in particular an inorganic layer, on the anode side. The anode-side layer has an anode contact side which rests against or which may be placed against the anode. At least one lithium ion-conducting layer, in particular a polymer layer, which contains at least one agent which is reactable with metallic lithium to form an electrically insulating solid is situated on a side of the anode-side layer opposite from the anode contact side. Moreover, the invention relates to an anode which is equipped with such a protective layer system, a lithium cell, and a lithium battery.

18 Claims, 3 Drawing Sheets

(51) Int. Cl.
*H01M 10/052* (2010.01)
*H01M 10/42* (2006.01)
*H01M 4/36* (2006.01)
*H01M 4/38* (2006.01)
*H01M 12/08* (2006.01)
*H01M 4/02* (2006.01)

(52) U.S. Cl.
CPC ............ *H01M 4/366* (2013.01); *H01M 4/382* (2013.01); *H01M 10/052* (2013.01); *H01M 12/08* (2013.01); *H01M 2004/027* (2013.01); *H01M 2220/20* (2013.01); *H01M 2220/30* (2013.01); *Y02E 60/128* (2013.01)

PROTECTIVE LAYER SYSTEM FOR A METALLIC LITHIUM ANODE

FIELD OF THE INVENTION

The present invention relates to a protective layer system and an anode equipped with same, a lithium cell, and a lithium battery.

BACKGROUND INFORMATION

Metallic lithium is used as anode material in various types of lithium batteries, in particular the so-called post lithium-ion batteries, for example lithium-sulfur and/or lithium-oxygen cells or batteries.

However, in metallic lithium anodes, parasitic reactions with the electrolyte or materials contained therein, for example polysulfides in the case of a lithium-sulfur cell, may take place, as the result of which the lithium and also the electrolyte, for example, may become depleted.

To prevent this, a protective layer which has a sufficiently high lithium ion conductivity and prevents direct contact between the metallic lithium and the electrolyte may be provided on the metallic lithium anode. However, these types of protective layers function properly only as long as they have no defects such as cracks, holes, etc. As soon as a defect site has developed, metallic lithium, for example in the form of dendrites, which may be deposits at the defect site, since the increased resistance otherwise associated with the protective layer is not present at that location. For this reason, defects may even increase in size once they have developed.

SUMMARY OF THE INVENTION

The subject matter of the present invention relates to a protective layer system for a lithium-containing, in particular a metallic lithium-containing, anode of a lithium cell.

The protective layer system includes in particular a lithium ion-conducting layer on the anode side. The anode-side layer may be, for example, an inorganic layer or a polymer layer, in particular an inorganic layer. The anode-side layer has in particular an anode contact side which rests against or which may be placed against the anode. In particular, at least one (additional) lithium ion-conducting layer, for example a polymer layer and/or inorganic layer, in particular a polymer layer, is situated on a side of the anode-side layer, for example the inorganic layer or polymer layer, opposite from the anode contact side, and contains at least one agent which is reactable with metallic lithium to form an electrically insulating solid.

A protective layer system may in particular be understood to mean a protective system made up of at least two layers or, for example, also more layers. In particular, the layers may rest against one another in the manner of a sandwich, for example. For example, the layers may rest against one another in such a way that lithium ions, for example, may migrate through the layers in succession. As a whole, the layers may form a type of overall layer. This type of protective layer system may therefore also be referred to as a multi-ply protective layer, for example, in which case in particular the plies may represent the individual layers.

A metallic lithium-containing anode may be understood in particular to mean an anode which contains metallic lithium and in particular has metallic properties. A metallic lithium-containing anode may in particular include metallic lithium or a lithium alloy as anode material. For example, a metallic lithium-containing anode may be an anode made of metallic lithium, or an anode made of a lithium alloy. A metallic lithium-containing anode may also be referred to as a metallic lithium anode or a lithium metal anode, for example.

A lithium cell may be understood in particular to mean an electrochemical cell, for example an electrochemical energy storage cell, whose anode contains lithium, in particular metallic lithium, as active material, for example. For example, the lithium cell may be a lithium-sulfur cell and/or a lithium-oxygen cell, for example a lithium-air cell, and/or a cell whose anode contains metallic lithium and whose cathode contains a lithium intercalation material, for example lithium-cobalt oxide (LCO), and/or lithium-nickel and/or lithium-manganese and/or lithium-cobalt oxide (NMC), and/or lithium-nickel-cobalt-aluminum or lithium-nickel-cobalt-aluminum oxide (NCA), and/or lithium-iron phosphate ($LiFePO_4$), and/or in particular superlithiated or high-energy lithium-nickel and/or lithium-cobalt and/or lithium-manganese oxide (high-energy NCM (HE-NCM)).

A lithium ion-conducting inorganic layer may be understood in particular to mean a layer which contains or is made of at least one lithium ion-conducting inorganic material, in particular in the form of a solid. For example, an inorganic layer may contain or be made of at least one lithium ion-conducting ceramic and/or vitreous material. In particular, the inorganic layer may contain or be made of at least one lithium ion-conducting ceramic material. When the inorganic layer contains at least one lithium ion-conducting ceramic material, the inorganic layer may be referred to in particular as a ceramic layer.

A lithium ion-conducting polymer layer may be understood in particular to mean a layer which is lithium ion-conducting and which contains or is made of at least one polymer. The lithium ion-conducting polymer layer may contain or be made of at least one in particular intrinsically or independently lithium ion-conducting polymer. Alternatively or additionally, the lithium ion-conducting polymer layer may contain at least one, for example nonion-conducting, polymer, for example, in which the lithium ion conduction may be ensured by a lithium electrolyte, for example with which the polymer is impregnated and/or swollen. In particular, the lithium ion-conducting polymer layer may contain at least one in particular intrinsically or independently lithium ion-conducting polymer.

The present invention is based on the finding that even a protective layer, produced without defects, for an anode containing lithium, in particular metallic lithium, generally may not remain completely intact over the long term due to volume movements in the cell which may result from the lithium dissolution and lithium deposition, for example, and defect sites may be formed over time. However, since in the case of defect sites, the deposition of metallic lithium may take place at the defect sites, which may thus increase even further in size, in order to reliably maintain the protective function over the long term it is advantageous to ensure that the protective layer system as a whole remains intact and free of defects.

According to the present invention, this is achieved in that in the event of defects such as cracks, holes, etc., which may develop over the service life of the cell in an anode-side layer, for example in a brittle inorganic layer, metallic lithium, for example in dendrite form, which is present in the defect sites comes into contact with the agent contained in a different layer of the protective layer system which adjoins the anode-side layer, for example, and reacts to form an electrically insulating solid. The reaction product, namely, the electrically insulating solid, may then overlay the metallic lithium and the defect site, for example by encapsulating the dendrite tip, and thus once again seal or close off the defect sites. In this way, defect sites may advantageously be intercepted or arrested and rendered harmless, and the protective layer system may repair itself. Accordingly, the protective layer system may also be referred to as a self-repairing protective layer system. As a result of this mechanism, the situation may advantageously be prevented that developed defect sites continue to enlarge, and metallic lithium, for example, in particular in dendrite form, grows through the protective layer system, for example the defective layer. In particular, the situation may thus advantageously be prevented that dendrites originating from the defective layer may also grow through the adjoining layer, for example a polymer layer, and/or optionally further layers such as ceramic and/or polymer layers, or these layers may be penetrated by the dendrites, which could occur with multi-ply protective layers in the absence of an agent.

As a result of the reaction products closing off, for example tightly, the defect sites, and the protective layer system as a whole being able to remain intact, in particular passage of liquid, for example liquid electrolyte and/or liquid polysulfides, through the protective layer system, and thus reactions between lithium and the liquid, for example liquid electrolyte and/or liquid polysulfides, may be prevented, thereby extending the cycling stability and thus the service life.

Due to the in particular self-repairing protective layer system, the service life and/or cycling stability of a cell equipped in this way, in particular with a metallic lithium anode, may be advantageously increased overall. In addition, as a result of the protective layer system, the reliability of cells or batteries, in particular which include a metallic lithium anode, may also be increased.

The protective layer system may advantageously be used in all secondary and primary lithium cells or batteries whose anode contains lithium, in particular metallic lithium. The protective layer system, for example with the modifications described in the specific embodiments, may advantageously be used essentially regardless of the cathode chemistry or cathode structure. Therefore, an anode which contains lithium, in particular metallic lithium, and which is equipped with the protective layer system may advantageously be used essentially with all existing and conceivable cathodes or cathode materials.

With the aid of this type of self-repairing mechanism, defects which developed in a ceramic layer or also in a polymer layer may advantageously be rendered harmless. The at least one (additional) layer containing the agent may be one or multiple polymer layer(s) and/or inorganic layer(s).

Within the scope of one specific embodiment, at least one lithium ion-conducting polymer layer and/or at least one lithium ion-conducting inorganic layer which contain(s) at least one agent which is reactable with metallic lithium to form an electrically insulating solid are/is situated on the side of the anode-side layer opposite from the anode contact side.

Polymer layers may be provided in a particularly simple manner with organic as well as inorganic agents which are reactable with metallic lithium to form an electrically insulating solid.

Within the scope of another specific embodiment, at least one lithium ion-conducting polymer layer that contains at least one agent which is reactable with metallic lithium to form an electrically insulating solid is thus situated on the side of the anode-side layer opposite from the anode contact side.

Inorganic layers may be easily provided with inorganic agents which are reactable with metallic lithium to form an electrically insulating solid. However, in principle it is also possible to provide inorganic layers with organic agents which are reactable with metallic lithium to form an electrically insulating solid. Thus, at least one lithium ion-conducting inorganic layer, in particular in addition or as an alternative to a polymer layer, containing an agent which is reactable with metallic lithium to form an electrically insulating solid may also be situated on the side of the anode-side layer opposite from the anode contact side.

In principle, the layer or layers containing the agent may thus be a polymer layer/layers or also an inorganic layer/layers.

In principle, the anode-side layer as well may be an inorganic layer or also a polymer layer.

In particular, however, the anode-side layer and at least one layer containing the agent may be made of different materials. For example, the anode-side layer may be an inorganic layer, and at least one layer containing the agent may be a polymer layer, or conversely, the anode-side layer may be a polymer layer, and at least one layer containing the agent may be an inorganic layer.

Within the scope of another specific embodiment, the anode-side layer is an inorganic layer. Inorganic layers may advantageously have high mechanical stability against dendrite growth and high chemical stability against metallic lithium. In addition, particularly liquid-tight layers may advantageously be made of inorganic, for example ceramic, materials, as the result of which side reactions may advantageously be avoided, as explained in greater detail below.

For example, at least one lithium ion-conducting polymer layer and/or at least one lithium ion-conducting inorganic layer that contain(s) at least one agent which is reactable with metallic lithium to form an electrically insulating solid may be situated on the side of the anode-side inorganic layer opposite from the anode contact side. In particular, at least one lithium ion-conducting polymer layer of the protective layer system may contain at least one agent which is reactable with metallic lithium to form an electrically insulating solid. As a result of the polymer layer, a self-repairing effect may thus advantageously be achieved, and in addition, due to the flexibility of the polymer layer, the stability of the protective layer system during volume changes may be increased.

Within the scope of another specific embodiment, the anode-side layer is a polymer layer. Polymer layers may advantageously have high flexibility, which may be beneficial for their stability during volume changes.

For example, at least one lithium ion-conducting inorganic layer and/or at least one lithium ion-conducting polymer layer which contain(s) at least one agent which is reactable with metallic lithium to form an electrically insulating solid may be situated on the side of the anode-side polymer layer opposite from the anode contact side. In particular, at least one lithium ion-conducting inorganic layer which may contain, or be free of, at least one agent which is reactable with metallic lithium to form an electrically insulating solid may be situated on the side of the anode-side polymer layer opposite from the anode contact side. High mechanical stability of the protective layer system against dendrite growth may thus advantageously be achieved. Likewise, the self-repairing effect may also be achieved by the inorganic layer when the inorganic layer contains at least one agent which is reactable with metallic lithium to form an electrically insulating solid. However, the self-repairing effect may also be achieved by a polymer layer, in addition to the inorganic layer, which contains at least one agent which is reactable with metallic lithium to form an electrically insulating solid.

In addition, the protective layer system may include a cathode-side layer. The cathode-side layer may in particular be the layer of the protective layer system which faces or may face the cathode. The cathode-side layer may in particular be lithium ion-conducting.

At least the anode contact side of the anode-side layer of the protective layer system may be free of an agent which is reactable with metallic lithium to form an electrically insulating solid. A premature reaction of the metallic lithium of the anode may thus advantageously be avoided, and the service life of the cell and/or the current rate of the cell may be increased.

Within the scope of another specific embodiment, the anode-side layer of the protective layer system is free of an agent which is reactable with metallic lithium to form an electrically insulating solid. The service life of the cell and/or the current rate of the cell may thus advantageously be increased in a simple and reliable manner.

Within the scope of another alternative or additional specific embodiment, the cathode-side layer of the protective layer system is free of an agent which is reactable with metallic lithium to form an electrically insulating solid. Undesirable side reactions, in particular of such an agent, with the cathode or the cathode material and/or an electrolyte and/or separator, etc., may thus advantageously be avoided.

When the anode-side layer and the cathode-side layer are free of an agent which is reactable with metallic lithium to form an electrically insulating solid, the at least one lithium ion-conducting layer, in particular on the side of the anode-side layer opposite from the anode contact side, which contains at least one agent which is reactable with metallic lithium to form an electrically insulating solid may be situated in particular between the anode-side layer and the cathode-side layer.

Within the scope of another specific embodiment, the cathode-side layer of the protective layer system is liquid-tight. Penetration of liquid, for example liquid electrolyte and/or liquid polysulfides, into the protective layer system, and optionally side reactions with the agent which is reactable with metallic lithium to form an electrically insulating solid, and/or possibly anode material, in particular metallic lithium, may thus advantageously be avoided.

Within the scope of another alternative or additional specific embodiment, the anode-side layer of the protective layer system is liquid-tight. Side reactions of anode material, in particular metallic lithium, with possible liquid components of the protective layer system, for example liquid agents which are reactable with metallic lithium to form an electrically insulating solid, and/or possibly other liquid components of the cell, for example the cathode and/or an electrolyte and/or a separator, may thus advantageously be avoided.

As previously explained, particularly liquid-tight layers may advantageously be made of inorganic, for example ceramic, materials.

When the protective layer system includes further inorganic layers, these may be liquid-tight or also liquid-permeable. However, the further inorganic layers in particular may also be liquid-tight. Optionally, all inorganic layers of the protective layer system may be liquid-tight.

In principle, the cathode-side layer of the protective layer system may be an inorganic layer or polymer layer which in particular is lithium ion-conducting.

Within the scope of another specific embodiment, the cathode-side layer of the protective layer system is an inorganic layer which in particular is lithium ion-conducting.

The protective layer system may include at least three layers, for example. In particular, the protective layer system may include at least four or at least five or at least six layers. A particularly good protective effect may thus advantageously be achieved. For example, the protective layer system may include seven or eight layers.

Within the scope of another specific embodiment, the protective layer system includes at least two lithium ion-conducting inorganic layers and/or at least two lithium ion-conducting polymer layers. For example, the protective layer system may include at least three lithium ion-conducting inorganic layers and/or at least three lithium ion-conducting polymer layers. Particularly high stability of the protective layer system during volume changes may thus advantageously be achieved.

Within the scope of another specific embodiment, the inorganic layers and polymer layers of the protective layer system are situated in alternation. Particularly high stability of the protective layer system during volume changes may thus advantageously be achieved. For example, the protective layer system may be formed from alternating layers, for example alternating inorganic layers, in particular ceramic layers, and polymer layers.

When the protective layer system includes an anode-side inorganic layer, a lithium ion-conducting polymer layer may be applied to the anode-side inorganic layer, for example. A further inorganic layer may be applied, for example, on the polymer layer which is applied to the anode-side inorganic layer, and in turn a further polymer layer may be applied to the further inorganic layer. For example, the protective layer system may include at least two lithium ion-conducting further inorganic layers and at least two lithium ion-conducting further polymer layers. For example, the protective layer system may also include at least three lithium ion-conducting further inorganic layers and at least three lithium ion-conducting further polymer layers.

When the protective layer system also includes a cathode-side inorganic layer, at least one layer pair made up of a further inorganic layer and a further polymer layer may be situated, for example, between the polymer layer which is applied to the anode-side inorganic layer, and the cathode-side inorganic layer.

For example, at least two layer pairs, for example at least three layer pairs made up of a further inorganic layer and a further polymer layer, may be situated between the polymer layer which is applied to the anode-side inorganic layer, and the cathode-side inorganic layer.

For example, at least one agent which is reactable with metallic lithium to form an electrically insulating solid may be contained only in the first polymer layer or only in the polymer layer which is applied to the anode-side inorganic layer, and/or only in the last polymer layer or only in the polymer layer adjoining the cathode-side inorganic layer, or also in all polymer layers.

Alternatively or additionally, at least one further inorganic layer of the protective layer system may contain at least one agent which is reactable with metallic lithium to form an electrically insulating solid.

The anode-side inorganic layer and/or the cathode-side inorganic layer and/or the at least one further inorganic layer may in particular be a ceramic layer. Layers which may have particularly high mechanical stability against dendrite growth and/or chemical stability against metallic lithium and/or lithium ion conductivity and/or liquid-tightness may advantageously be made of ceramic materials.

Within the scope of another specific embodiment, the inorganic layer(s) of the protective layer system are/is therefore ceramic layers.

Within the scope of another specific embodiment, the protective layer system includes two or more layers, for example polymer layers and/or inorganic layers, in particular ceramic layers, which contain different concentrations of the at least one agent which is reactable with metallic lithium to form an electrically insulating solid. For example, the concentration of the agent in the layers may decrease or increase, for example gradually, from the anode side of the protective layer system to the cathode side of the protective layer system. As a result of the concentration decreasing from the anode side of the protective layer system to the cathode side of the protective layer system, it may advantageously be ensured that dendrite growth may be prevented early and effectively. As a result of the concentration increasing from the anode side of the protective layer system to the cathode side of the protective layer system, it may advantageously be ensured that dendrites which have grown even far through the protective layer system may still be effectively intercepted.

The at least one agent which is reactable with metallic lithium to form an electrically insulating solid may be added to the layer or the layers in particular in the form of a supplemental material, for example an additive. For example, the at least one agent which is reactable with metallic lithium to form an electrically insulating solid may be embedded in the (particular) layer.

Within the scope of another specific embodiment, the at least one agent which is reactable with metallic lithium to form an electrically insulating solid is an additive. Dendrite growth may advantageously be slowed or stopped by adding even small quantities of an agent which is reactable with metallic lithium to form an electrically insulating solid. The at least one agent which is reactable with metallic lithium to form an electrically insulating solid may be added as an additive to polymer layers as well as to inorganic layers.

The at least one agent which is reactable with metallic lithium to form an electrically insulating solid may in particular be an agent which is chemically inert with respect to the material of the contained layer. In principle, the at least one agent which is reactable with metallic lithium to form an electrically insulating solid may itself be nonlithium ion-conducting. However, the at least one agent which is reactable with metallic lithium to form an electrically insulating solid in particular may itself also be lithium ion-conducting.

In principle, for example all chemical compounds which react with metallic lithium and which in the process may form one or multiple reaction products in the form of electrically insulating solids are suitable as an agent which is reactable with metallic lithium to form an electrically insulating solid.

For example, the at least one agent which is reactable with metallic lithium to form an electrically insulating solid may be a compound that contains, for example, one or multiple functional groups which may react with metallic lithium to form a lithium salt in the form of a solid, for example lithium carbonate, lithium nitrite, lithium nitride, lithium sulfate, lithium sulfite, lithium sulfide, lithium carboxylate, lithium oxalate, lithium oxide, lithium chloride, lithium perchlorate, and/or lithium silicate.

Alternatively or additionally, for this purpose the at least one agent which is reactable with metallic lithium to form an electrically insulating solid may polymerize upon contact with metallic lithium.

Within the scope of another specific embodiment, the at least one agent which is reactable with metallic lithium to form an electrically insulating solid is therefore reactable with metallic lithium to form a lithium salt in the form of a solid, and/or polymerizable by metallic lithium.

Alternatively or additionally, the at least one agent which is reactable with metallic lithium to form an electrically insulating solid may polymerize, for example ionically, by metallic lithium to form a lithium ion-conducting polymer.

Within the scope of another specific embodiment, the at least one agent which is reactable with metallic lithium to form an electrically insulating solid is therefore polymerizable by metallic lithium to form a lithium ion-conducting polymer. The service life of the cell and/or the current rate of the cell may thus advantageously be increased.

For example, the at least one agent which is reactable with metallic lithium to form an electrically insulating solid may be a polymerizable monomer, in particular which is polymerizable to form lithium ion-conducting polymers, such as an epoxide, for example ethylene oxide and derivatives thereof, and/or an unsaturated compound having an electrophilic carbon, for example acrylonitrile and/or styrenesulfonic acid and derivatives thereof. Epoxides, for example ethylene oxide and derivatives thereof, and/or unsaturated compounds having an electrophilic carbon, for example acrylonitrile and/or styrenesulfonic acid and derivatives thereof, may advantageously be polymerized by metallic lithium to form lithium ion-conducting polymers, for example polyethylene oxide (polyethylene glycol) and/or polyacrylonitrile and/or polystyrenesulfonic acid.

Alternatively or additionally, for this purpose the at least one agent which is reactable with metallic lithium to form an electrically insulating solid may be an organic carbonate, a lactone, a lithium salt which in particular is soluble or dissolved, such as lithium nitrate and/or lithium perchlorate and/or lithium hexafluorophosphate, an azo compound, for example an azoalkane such as tBu-$N_2$, a sulfonic acid, a sulfinic acid, a polysulfide, a carboxylic acid salt, and/or a silicone and/or a silane.

Organic carbonates and lactones may, for example, react with metallic lithium to form lithium carbonate. Lithium nitrate may, for example, react with metallic lithium to form lithium nitrite and lithium oxide. Lithium perchlorate may, for example, react with metallic lithium to form lithium oxide and lithium chloride. Lithium hexafluorophosphate may, for example, react with metallic lithium to form lithium fluoride. Azo compounds, for example azoalkanes such as tBu-$N_2$, may, for example, react with metallic lithium to form lithium nitride. Sulfonic acids may, for example, react with metallic lithium to form lithium sulfate. Sulfinic acids may, for example, react with metallic lithium to form lithium sulfite. Polysulfides may, for example, react with metallic lithium to form lithium sulfide. Carboxylic acid salts, for example oxalates, may, for example, react with metallic lithium to form lithium carboxylates, for example lithium oxalate. Silicones and/or silanes, for example halogenated silanes, may, for example, react with metallic lithium to form lithium silicate.

Within the scope of another specific embodiment, the at least one agent which is reactable with metallic lithium to form an electrically insulating solid is therefore selected from the group of polymerizable monomers, in particular to form lithium ion-conducting polymers, such as epoxides, for example ethylene oxide, and/or unsaturated compounds having an electrophilic carbon, for example acrylonitrile and/or styrenesulfonic acid, and/or organic carbonates, and/or lactones, and/or lithium salts which in particular are soluble or dissolved, such as lithium nitrate and/or lithium perchlorate and/or lithium hexafluorophosphate, and/or azo compounds, for example azoalkanes such as tBu-$N_2$, and/or sulfonic acids, and/or sulfinic acids, and/or polysulfides, and/or carboxylic acid salts, and/or silicones and/or silanes, and/or combinations or mixtures thereof.

With regard to further technical features and advantages of the protective layer system according to the present invention, explicit reference is hereby made to the explanations in conjunction with the anode according to the present invention, the cell and/or battery according to the present invention, the figures, and the description of the figures.

A further subject matter of the present invention relates to an anode for a lithium cell which contains lithium, in particular metallic lithium, and which is provided with a protective layer system according to the present invention. For example, the anode may contain metallic lithium or a lithium alloy as anode material. The anode may also include a current collector, for example a metallic current collector, made of copper, for example. For example, the anode material, for example metallic lithium or a lithium alloy, may be applied to the current collector, the protective layer system being applied to the anode material. In particular, the anode contact side of the anode-side layer of the protective layer system may adjoin the anode material.

With regard to further technical features and advantages of the anode according to the present invention, explicit reference is hereby made to the explanations in conjunction with the protective layer system according to the present invention, the cell and/or battery according to the present invention, the figures, and the description of the figures.

Moreover, the present invention relates to a lithium cell and/or lithium battery with an anode and a cathode, and which includes a protective layer system according to the present invention and/or an anode according to the present invention. For example, the lithium cell and/or lithium battery may be a lithium-sulfur cell and/or battery and/or a lithium-oxygen cell and/or battery.

The protective layer system may be applied to the anode, for example. The anode-side layer, in particular the anode contact side of the anode-side layer, of the protective layer system may adjoin the anode. The cathode-side layer of the protective layer system may in particular face the cathode or adjoin the cathode.

For example, the lithium cell and/or lithium battery may be used in a power tool, a gardening tool, a computer, a notebook/laptop, a mobile wireless device, for example a mobile telephone and/or a smartphone, and/or a tablet PC and/or PDA, in a vehicle, for example an electric vehicle, a hybrid vehicle, or a plug-in hybrid vehicle. Due to the particularly high demands on the service life in automotive applications, the lithium cell and/or lithium battery are/is particularly suited for electric vehicles, hybrid vehicles, and plug-in hybrid vehicles.

With regard to further technical features and advantages of the cell and/or battery according to the present invention, explicit reference is hereby made to the explanations in conjunction with the protective layer system according to the present invention, the anode according to the present invention, the figures, and the description of the figures.

Further advantages and advantageous embodiments of the subject matter according to the present invention are illustrated by the drawings and explained in the following description. It is pointed out that the drawings are only descriptive in nature, and are not intended to restrict the present invention in any way.

DETAILED DESCRIPTION

FIGS. 1 through 5 show that the specific embodiments of protective layer systems 10 illustrated therein each include a lithium ion-conducting inorganic layer 11 on the anode side, which with an anode contact side 11a rests against a metallic lithium-containing anode 1, multiple lithium ion-conducting polymer layers 12, 12', 12" being situated on a side 11b of anode-side inorganic layer 11 opposite from anode contact side 11a.

In particular, FIGS. 1 through 5 show that a lithium ion-conducting polymer layer 12 is applied to anode-side inorganic layer 11. Protective layer system 10 also includes two lithium ion-conducting further inorganic layers 11', 11" and two lithium ion-conducting further polymer layers 12', 12", which form two further layer pairs 11', 12'; 11" 12" made up of an inorganic layer 11', 11" and a polymer layer 12', 12". FIGS. 1 through 5 show that inorganic layers 11, 11', 11" and polymer layers 12, 12', 12" of protective layer system 10 are situated in alternation overall. Inorganic layers 11, 11', 11" may be ceramic layers, for example.

Within the scope of the specific embodiments shown in FIGS. 1 through 5, polymer layers 12, 12', 12" of the protective layer system each contain an agent 13 which is reactable with metallic lithium to form an electrically insulating solid 13*. For example, agent 13 may be reactable with metallic lithium to form a lithium salt in the form of a solid 13*, for example lithium carbonate, lithium nitrite, lithium nitride, lithium sulfate, lithium sulfite, lithium sulfide, lithium carboxylate, lithium oxalate, lithium oxide, lithium chloride, lithium perchlorate, and/or lithium silicate, and/or polymerizable by metallic lithium to form, for example, a lithium ion-conducting polymer such as polyethylene oxide (PEO) or polyethylene glycol (PEG). The agent may be used in particular in the form of an additive.

FIGS. 1 through 5 also show that anode 1 includes a current collector 2 made of copper, for example. Anode material of anode 1 on the one hand adjoins current collector 2, and on the other hand adjoins anode contact side 11a of anode-side layer 11 of protective layer system 10.

Figure 1:
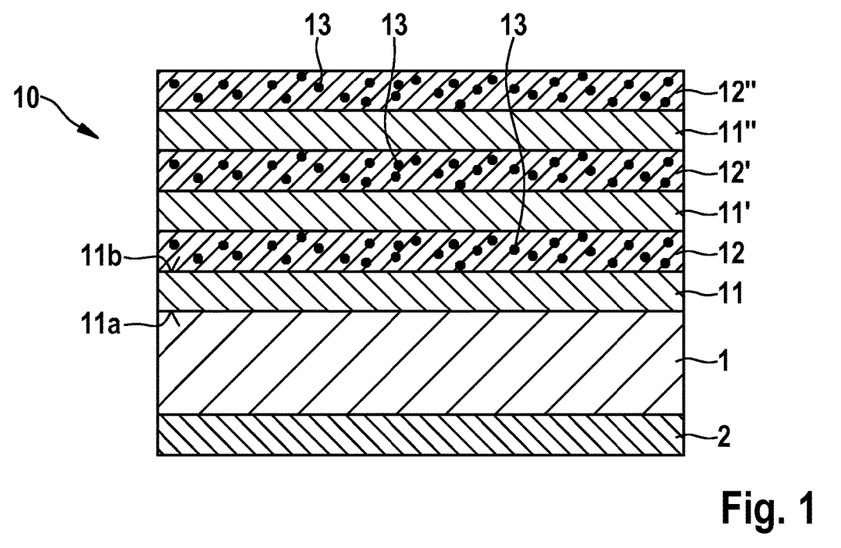
FIG. 1 shows a schematic cross section of an anode equipped with one specific embodiment of a protective layer system according to the present invention.
Figure 2:
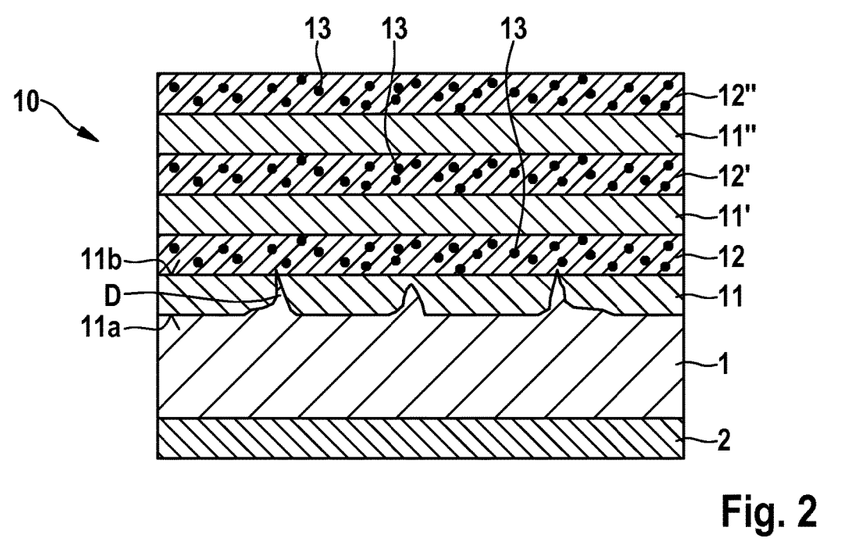
FIG. 2 shows a schematic cross section of the anode with a protective layer system shown in FIG. 1, at the start of formation of dendrites composed of metallic lithium from the anode.
Figure 3:
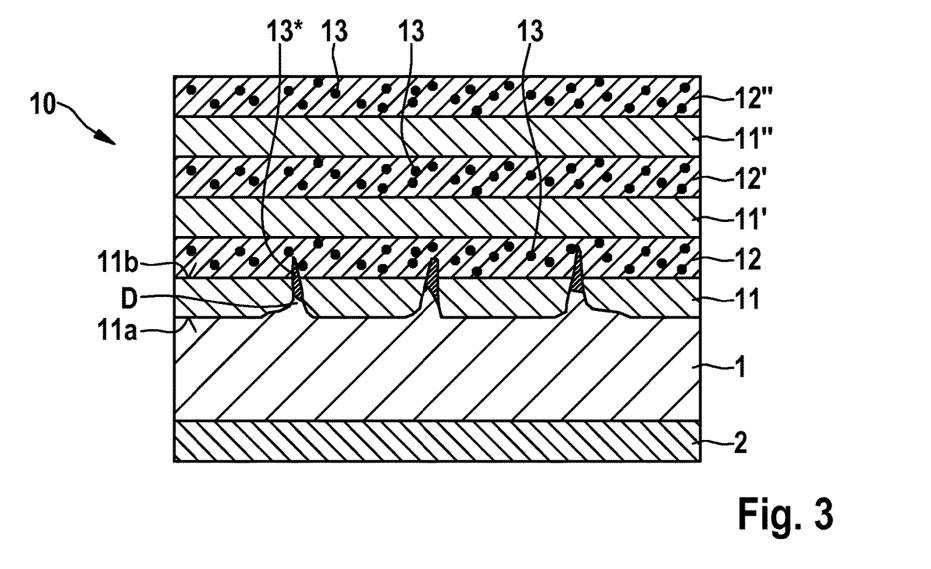
FIG. 3 shows a schematic cross section of the protective layer system shown in FIGS. 1 and 2 after the dendrite formation has been stopped by forming an electrically insulating solid by reaction of an agent, contained in polymer layers of the protective layer system, with the metallic lithium of the dendrites.

Within the scope of the specific embodiment shown in FIGS. 1 through 3, protective layer system 10 includes in particular three inorganic layers 11, 11', 11", for example ceramic layers, and three polymer layers 12, 12', 12" which are situated in alternation.

FIG. 2 shows that in the event of small defects in inorganic layer 11 adjoining anode 1, dendrites D composed of metallic lithium of anode 1 may grow into inorganic layer 11. This may be explained by the fact that the lithium ions at the defect sites do not have to overcome the resistance of inorganic layer 11, and therefore may deposit at these locations. Such a deposition may result in dendritic growth, originating from lithium anode 1, toward the counter electrode, for example the cathode, which may accelerate on its own once it has begun.

FIG. 3 shows that once dendrites D have grown through inorganic layer 11 adjoining anode 1 and reached polymer layer 12, the metallic lithium of dendrites D comes into contact with agent 13 contained in adjoining polymer layer 12, and may react with agent 13 to form one or multiple reaction products in the form of electrically insulating solids 13*. Reaction product(s) 13* composed of lithium and agent 13 may then encapsulate the tips of dendrites D in an electrically insulating manner and thus prevent further growth of dendrites D. In addition, the reaction products in the form of solids may close off or seal the defect sites tightly, in particular in a liquid-tight or electrolyte-tight manner, and thus render them harmless.

Figure 4:
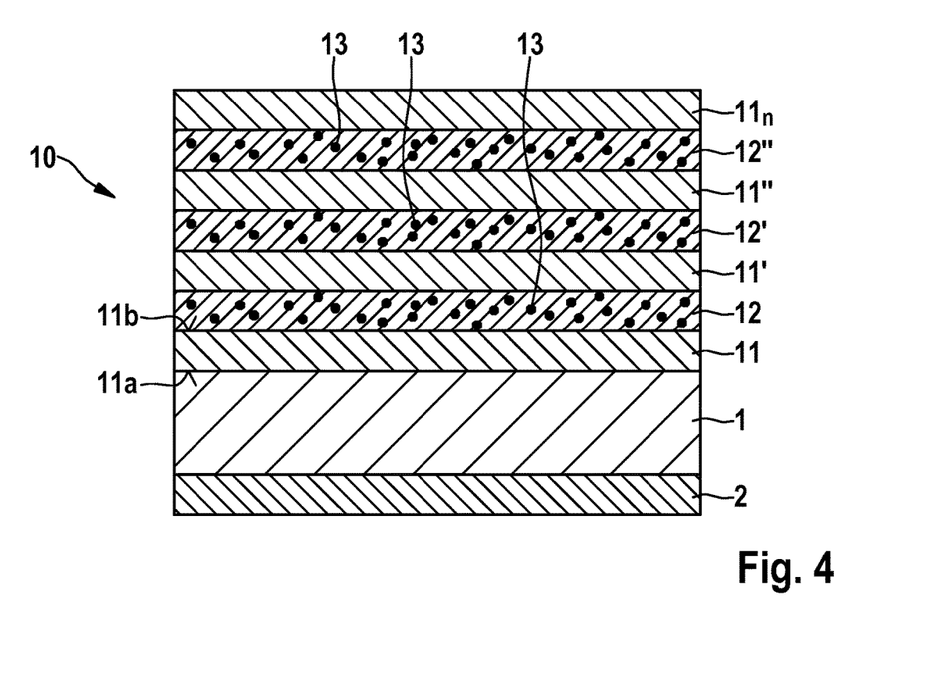
FIG. 4 shows a schematic cross section of an anode equipped with another specific embodiment of a protective layer system according to the present invention.

Within the scope of the specific embodiment shown in FIG. 4, protective layer system 10 also includes a lithium ion-conducting inorganic layer $11_n$ on the cathode side which is liquid-tight. Due to cathode-side inorganic layer $11_n$, for example in the case of a liquid-containing cathode, such as a liquid electrolyte-containing cathode, a reaction of agent 13 contained in polymer layers 11, 11', 11" with the liquid, for example the electrolyte, and/or the cathode material may be prevented, and agent 13 and/or the cathode may thus be protected from damage due to side reactions.

Figure 5:
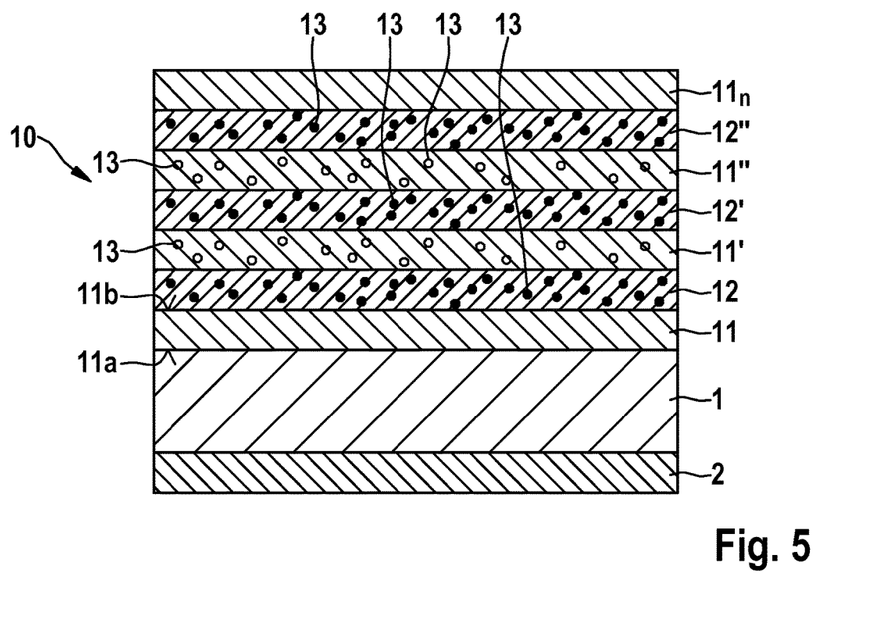
FIG. 5 shows a schematic cross section of an anode equipped with another specific embodiment of a protective layer system according to the present invention.

Within the scope of the specific embodiment shown in FIG. 5, further inorganic layer 11', 11"also contains an agent 13 which may react with metallic lithium to form an electrically insulating solid. For example, agent 13 may be embedded in further inorganic layers 11', 11".

Further inorganic layers 11', 11"may contain an agent 13 which is the same as or different from that in polymer layers 12, 12', 12".

FIGS. 1 through 5 also show that anode-side inorganic layer 11 and cathode-side inorganic layer $11_n$ may in particular be free of an agent 13 which is reactable with metallic lithium to form an electrically insulating solid 13* in order to avoid side reactions with anode 1 and the cathode (not illustrated).

What is claimed is:

1. A protective layer system for a metallic lithium-containing anode of a lithium cell, comprising:
   a first lithium ion-conducting layer on an anode side of the protective layer system, wherein the first layer includes an anode contact side which rests against or which is placed against the anode; and
   at least one lithium ion-conducting layer that contains at least one agent, the at least one lithium ion-conducting layer that contains the at least one agent being situated on a side of the first layer opposite from the anode contact side, the at least one agent being reactable with metallic lithium to form an electrically insulating solid on the side of the first layer opposite from the anode contact side,
   wherein the protective layer system includes at least two layers which contain different concentrations of the at least one agent which is reactable with metallic lithium to form an electrically insulating solid, the concentration of the agent in the layers decreasing or increasing from the anode side of the protective layer system to the cathode side of the protective layer system.

2. The protective layer system of claim 1, wherein at least one lithium ion-conducting polymer layer and/or at least one lithium ion-conducting inorganic layer which contain(s) at least one agent which is reactable with metallic lithium to form an electrically insulating solid is situated on the side of the anode-side layer opposite from the anode contact side.

3. The protective layer system of claim 1, wherein at least one lithium ion-conducting polymer layer that contains at least one agent which is reactable with metallic lithium to form an electrically insulating solid is situated on the side of the first layer opposite from the anode contact side.

4. The protective layer system of claim 1, wherein the protective layer system includes at least two lithium ion-conducting inorganic layers and at least two lithium ion-conducting polymer layers, the inorganic layers and polymer layers of the protective layer system being situated in an alternating manner.

5. The protective layer system of claim 1, wherein the protective layer system includes a cathode-side layer, the cathode-side layer of the protective layer system being an inorganic layer.

6. The protective layer system of claim 5, wherein the cathode-side layer and/or the first layer of the protective layer system is liquid-tight.

7. The protective layer system of claim 5, wherein the first layer and/or the cathode-side layer of the protective layer system is free of an agent which is reactable with metallic lithium to form an electrically insulating solid.

8. The protective layer system of claim 1, wherein the at least one agent which is reactable with metallic lithium to form an electrically insulating solid is an additive.

9. The protective layer system of claim 1, wherein the at least one agent which is reactable with metallic lithium to form an electrically insulating solid is reactable with metallic lithium to form a lithium salt in the form of a solid, and/or the at least one agent is polymerizable by metallic lithium.

10. The protective layer system of claim 1, wherein the at least one agent which is reactable with metallic lithium to form an electrically insulating solid is polymerizable by metallic lithium to form a lithium ion-conducting polymer.

11. The protective layer system of claim 1, wherein the lithium cell includes at least one of a lithium-sulfur cell and a lithium-oxygen cell.

12. The protective layer system of claim 1, wherein at least one lithium ion-conducting polymer layer and/or at least one lithium ion-conducting inorganic layer which contain(s) at least one agent which is reactable with metallic lithium to form an electrically insulating solid is situated on the side of the first layer opposite from the anode contact side.

13. The protective layer system of claim 1, wherein at least one lithium ion-conducting polymer layer that contains at least one agent which is reactable with metallic lithium to form an electrically insulating solid is situated on the side of the first layer opposite from the anode contact side.

14. A protective layer system for a metallic lithium-containing anode of a lithium cell, comprising:
- a first lithium ion-conducting layer on an anode side of the protective layer system, wherein the first layer includes an anode contact side which rests against or which is placed against the anode; and
- at least one lithium ion-conducting layer that contains at least one agent, the at least one lithium ion-conducting layer that contains the at least one agent being situated on a side of the first layer opposite from the anode contact side, the at least one agent being reactable with metallic lithium to form an electrically insulating solid on the side of the first layer opposite from the anode contact side,
- wherein the first layer is an inorganic layer.

15. The protective layer system of claim 14, wherein the inorganic layer of the protective layer system is a ceramic layer.

16. The protective layer of claim 14, wherein the protective layer system includes at least two layers which contain different concentrations of the at least one agent which is reactable with metallic lithium to form an electrically insulating solid, the concentration of the agent in the layers decreasing or increasing from the anode side of the protective layer system to the cathode side of the protective layer system.

17. An anode for a lithium cell having metallic lithium, comprising:
- a protective layer system for the lithium cell, including:
  - a first lithium ion-conducting layer on an anode side of the protective layer system, wherein the first layer includes an anode contact side which rests against or which is placed against the anode; and
  - at least one lithium ion-conducting layer that contains at least one agent, the at least one agent being reactable with metallic lithium to form an electrically insulating solid on a side of the first layer opposite from the anode contact side,
- wherein the protective layer system includes at least two layers which contain different concentrations of the at least one agent which is reactable with metallic lithium to form an electrically insulating solid, the concentration of the agent in the layers decreasing or increasing from the anode side of the protective layer system to the cathode side of the protective layer system.

18. A lithium cell, comprising:
an anode; and
a cathode;
wherein the lithium cell includes a protective layer system, including:
- a first lithium ion-conducting layer on an anode side of the protective layer system, wherein the first layer includes an anode contact side which rests against or is placed against the anode; and
- at least one lithium ion-conducting layer that contains at least one agent, the at least one lithium ion-conducting layer that contains the at least one agent being situated on a side of the first layer opposite from the anode contact side, the at least one agent being reactable with metallic lithium to form an electrically insulating solid on the side of the first layer opposite from the anode contact side,
wherein the lithium cell includes at least one of a lithium-sulfur cell and a lithium-oxygen cell, and
wherein the protective layer system includes at least two layers which contain different concentrations of the at least one agent which is reactable with metallic lithium to form an electrically insulating solid, the concentration of the agent in the layers decreasing or increasing from the anode side of the protective layer system to the cathode side of the protective layer system.

* * * * *